(12) United States Patent
Nakagawa

(10) Patent No.: US 6,292,633 B1
(45) Date of Patent: *Sep. 18, 2001

(54) OPTICAL APPARATUS WITH RECORDING OF SELECTED HIERARCHAL INFORMATION WITH RESPECT TO A REGION

(75) Inventor: Kazuyuki Nakagawa, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/217,001

(22) Filed: Dec. 21, 1998

(30) Foreign Application Priority Data

Dec. 24, 1997 (JP) .................................................. 9-365954

(51) Int. Cl.[7] .................................................. G03B 17/24
(52) U.S. Cl. ........................................... 396/311; 396/319
(58) Field of Search .................................... 396/310, 311, 396/315, 317, 318, 319, 320

(56) References Cited

U.S. PATENT DOCUMENTS

| | | | | |
|---|---|---|---|---|
| 5,296,884 | * | 3/1994 | Honda et al. | 396/311 |
| 5,389,989 | * | 2/1995 | Hawkins et al. | 396/315 |
| 5,506,644 | * | 4/1996 | Suzuki et al. | 396/319 |
| 5,671,451 | * | 9/1997 | Takahashi et al. | 396/310 |
| 5,768,640 | * | 6/1998 | Takahashi et al. | 396/310 |

* cited by examiner

Primary Examiner—David M Gray
(74) Attorney, Agent, or Firm—Robin, Blecker & Daley

(57) ABSTRACT

An optical apparatus includes a detecting device for detecting position information, and a recording device for recording the detected position information on an image recording medium, wherein the recording device also records hierarchy information relative to the position information on the image recording medium.

8 Claims, 5 Drawing Sheets

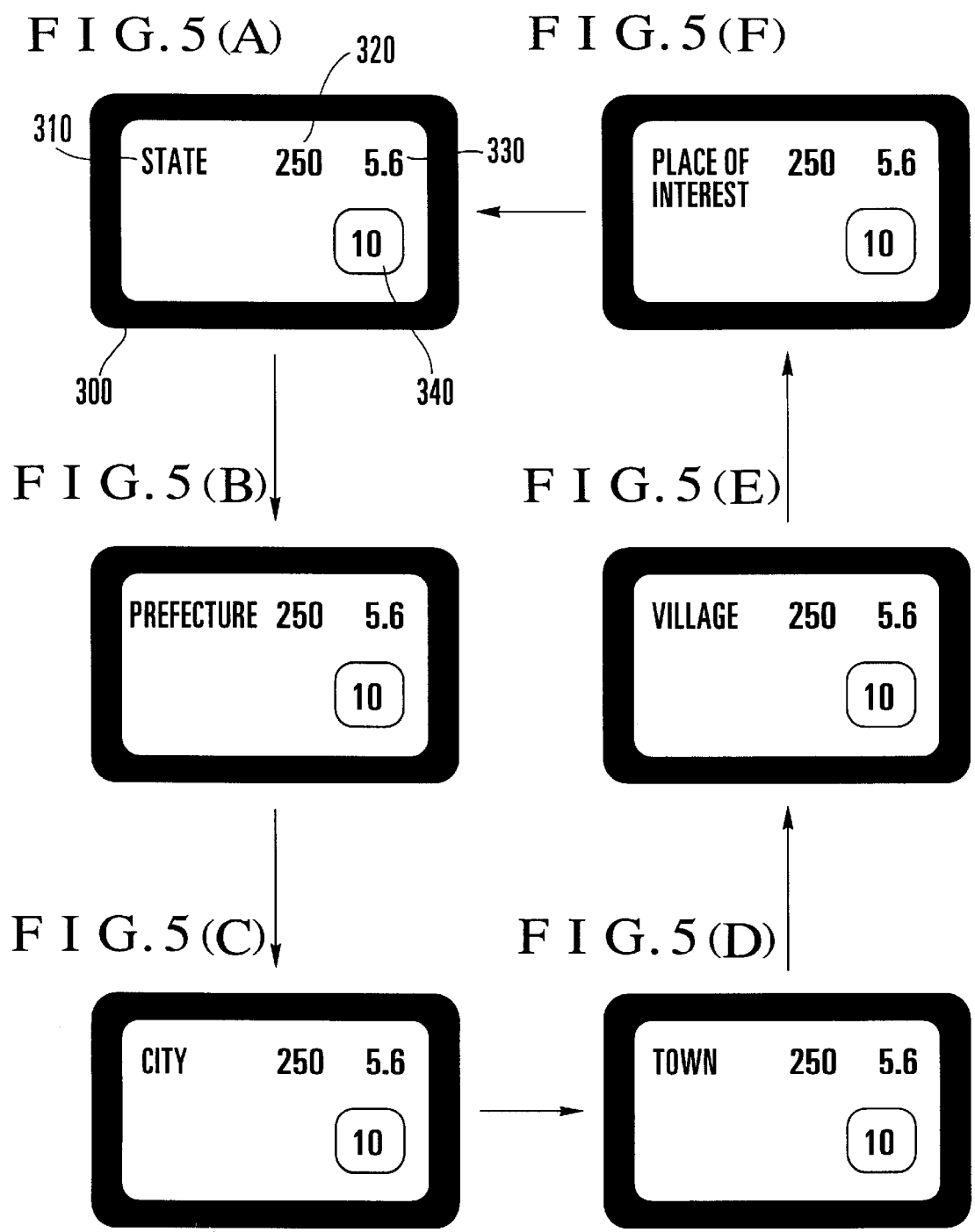

OPTICAL APPARATUS WITH RECORDING OF SELECTED HIERARCHAL INFORMATION WITH RESPECT TO A REGION

BACKGROUND OF THE INVENTION

1. Field of the Invention

The present invention relates to an optical apparatus capable of recording position information on an image recording medium.

2. Description of Related Art

There has heretofore been a camera which is provided with a GPS (Global Positioning System) receiver (position measuring means for receiving radio waves from satellites and outputting position information), but there has not yet been a camera which has means for indicating how minutely information should be displayed on the basis of position information received by the GPS receiver.

Japanese Laid-Open Patent Application No. Hei 6-110117 proposes a camera in which place-name data are stored in a place-name data table. This known camera is arranged so that a user operates an operating member to select place-name data stored in the camera and record the selected place-name data so as to make the place-name data correspond to an photographed image.

However, since the above-described camera provided with the GPS receiver does not have means for indicating how minutely information should be displayed, the user needs to specify which information item should be used, when the user is to make use of the information.

In addition, in the case of the camera proposed in Japanese Laid-Open Patent Application No. Hei 6-110117, the user needs to select and set the location of photography (such as Japan or Tokyo) and, therefore, may record erroneous data by mistaken setting, or the user may forget to perform setting and photography location information may be lost. Furthermore, since all data to be selected need to be stored in the camera, the camera needs a huge storage capacity for storing such data.

BRIEF SUMMARY OF THE INVENTION

It is, therefore, an object of the present invention to provide an optical apparatus which is arranged to detect position information and record the detected position information on an image recording medium and also record on the image recording medium information which indicates which hierarchal level of the position information should be displayed.

Other objects of the present invention will become apparent from the following detailed description of a preferred embodiment of the present invention, taken in conjunction with the accompanying drawings.

BRIEF DESCRIPTION OF THE SEVERAL VIEWS OF THE DRAWING

FIGS. 5(A) to 5(F) are views showing display examples obtained when set hierarchy information is changed in the camera according to the embodiment of the present invention.

DETAILED DESCRIPTION OF THE INVENTION

Preferred embodiments of the present invention will be described below in detail with reference to the accompanying drawings.

Figure 1:
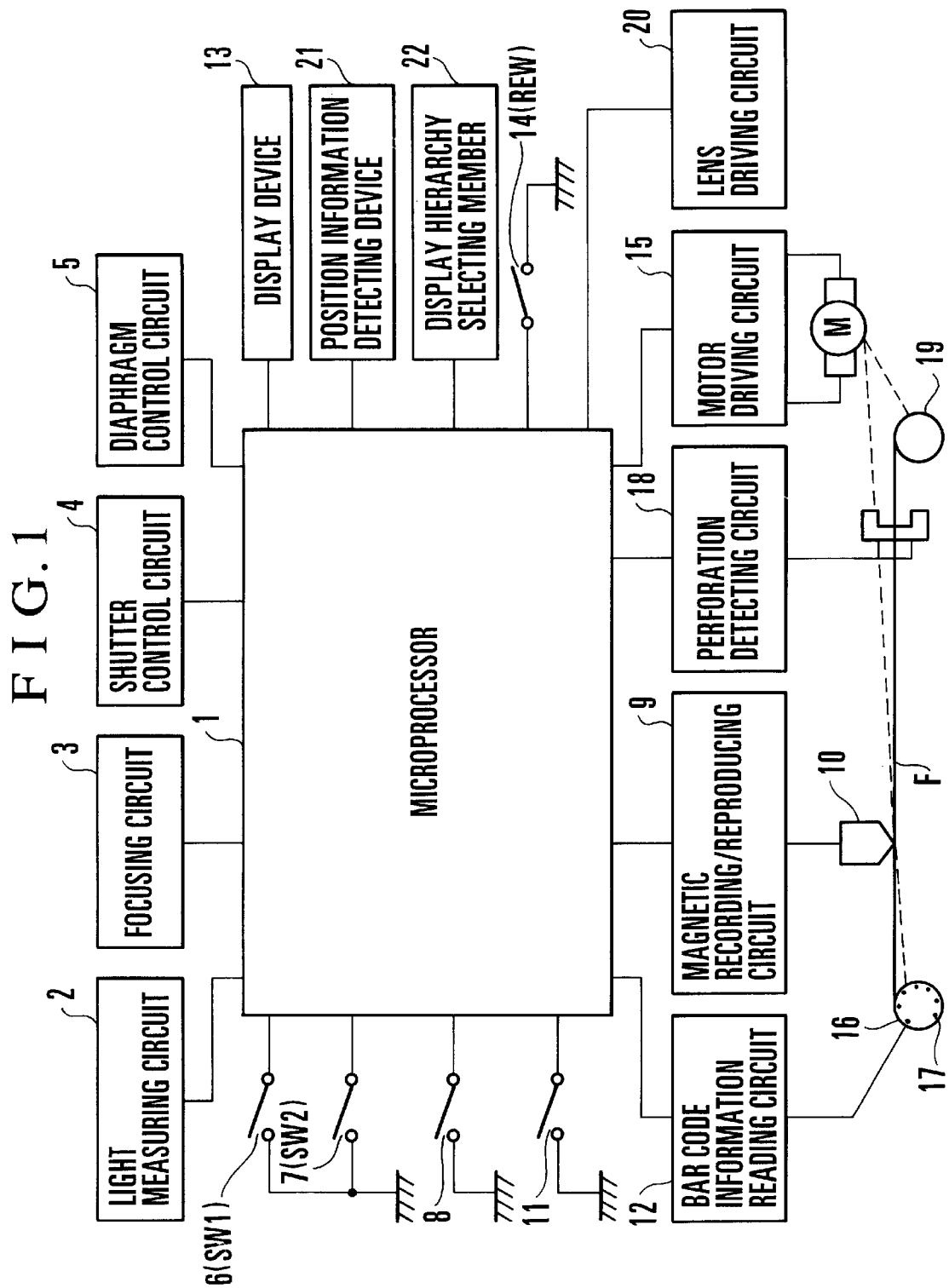
FIG. 1 is a block diagram showing the electrical arrangement of a camera according to an embodiment of the present invention.

FIG. 1 is a block diagram showing the electrical arrangement of a camera according to an embodiment of the present invention.

The electrical arrangement shown in FIG. 1 includes a microprocessor 1 which is responsible for control of the entire camera which is one example of an optical apparatus, a light measuring circuit 2, a focusing circuit 3 (which detects the state of focus of a subject to be photographed (image-taken) or the distance to the subject), a shutter control circuit 4, and a diaphragm control circuit 5. All of the elements 1 to 5 are known matter.

The electrical arrangement also includes a switch 6 (SW1) for starting light measurement and focusing, and a switch 7 (SW2) for starting a photographing (image-taking) operation. The switches 6 and 7 are respectively turned on at the first and second stroke positions of a release button. The electrical arrangement also includes a main switch 8, a magnetic recording/reproducing circuit 9, a magnetic head 10, a cartridge chamber lid switch 11 for detecting whether a cartridge chamber into which to load a film cartridge 16 is in an open or closed state, a bar code information reading circuit 12 for reading information from a data disk 17 (to be described later) of the film cartridge 16, a display device 13 which includes a display for displaying a shutter time and an aperture value, the presence or absence of the film cartridge 16, a warning for film removal and the like, as well as a driving circuit for the display, and a midroll interrupt rewinding switch 14 (REW) for inputting an instruction to start a midroll interrupt film rewinding operation. Symbol F denotes a silver-halide film which serves as an image recording medium (hereinafter referred to as the film).

The electrical arrangement also includes a motor driving circuit 15 for advancing or rewinding the film F from or into the film cartridge 16. Specifically, the motor driving circuit 15 has the function of driving a film supply spool in the thrust-type film cartridge 16 in a film advancing direction to advance the film F from the film cartridge 16 and wind the advanced film F around a film winding spool 19, as well as the function of driving the film supply spool in the film cartridge 16 in a film rewinding direction to rewind the film F into the film cartridge 16.

The bar code disk 17 is provided integrally with the film supply spool in the film cartridge 16, and constitutes a bar code-recorded part which has a bar code recorded on the surface of the film supply spool which rotates with the rotation thereof. The electrical arrangement also includes a perforation detecting circuit 18 for detecting perforations formed in the film F, and the perforation detecting circuit 18 includes, for example, light-emitting parts and light-receiving parts of photoreflectors and detects the presence or absence of perforations in the film F. The electrical arrangement also includes a lens driving circuit 20 for focusing, a position information detecting device 21 for detecting photography position information (image-taking position information), and a display hierarchy selecting member 22 for selecting a hierarchal level at which to display the photography position information detected by the position information detecting device 21.

Figure 2:
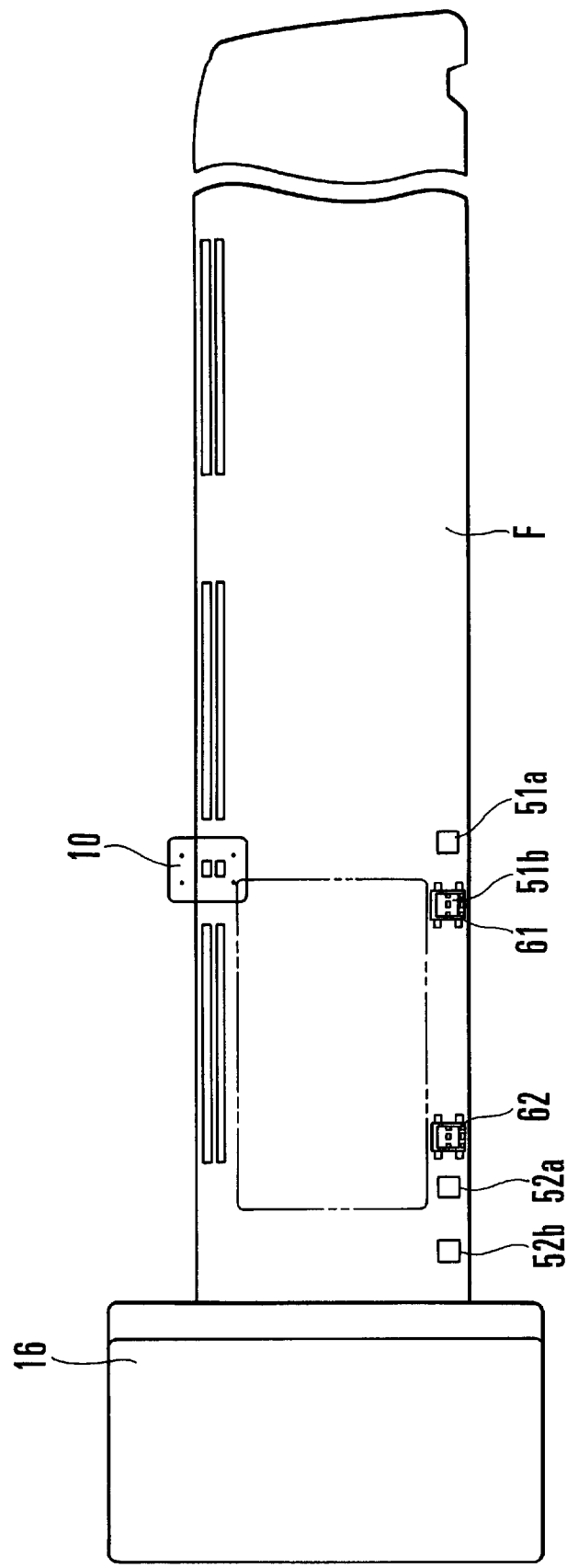
FIG. 2 is a schematic view showing the positional relationship between a magnetic head and photoreflectors in the camera according to the embodiment of the present invention.

FIG. 2 shows the positional relationship between a magnetic head for writing magnetic data to the magnetically writable type of film F and photoreflectors for detecting perforations in the film F in the camera having the above-described arrangement.

As shown in FIG. 2, perforations 51a, 51b, 52a, 52b ... are present in the magnetically writable type of film F so that each frame of the film F can be positioned. Two perforations are formed for each frame, whereby the frame position of the film F is prevented from deviating from an aperture.

Photoreflectors 61 and 62 for detecting the perforations 51a, 51b, 52a, 52b ... serve to detect the frame position of the film F. The magnetic head 10 is provided for writing or reading information to or from the magnetically writable type of film F.

In the film F, camera information writing areas are respectively present in the -1st frame portion, the 0th frame portion and unexposed frame portions which start at the 1st frame portion.

Photography position information (image-taking position information) to be recorded by the camera according to the present embodiment and hierarchy setting information such as state, city, town or place of interest are written to each frame portion so that the photography position information and the hierarchy setting information are made to correspond to the image of each exposed frame.

Figure 3:
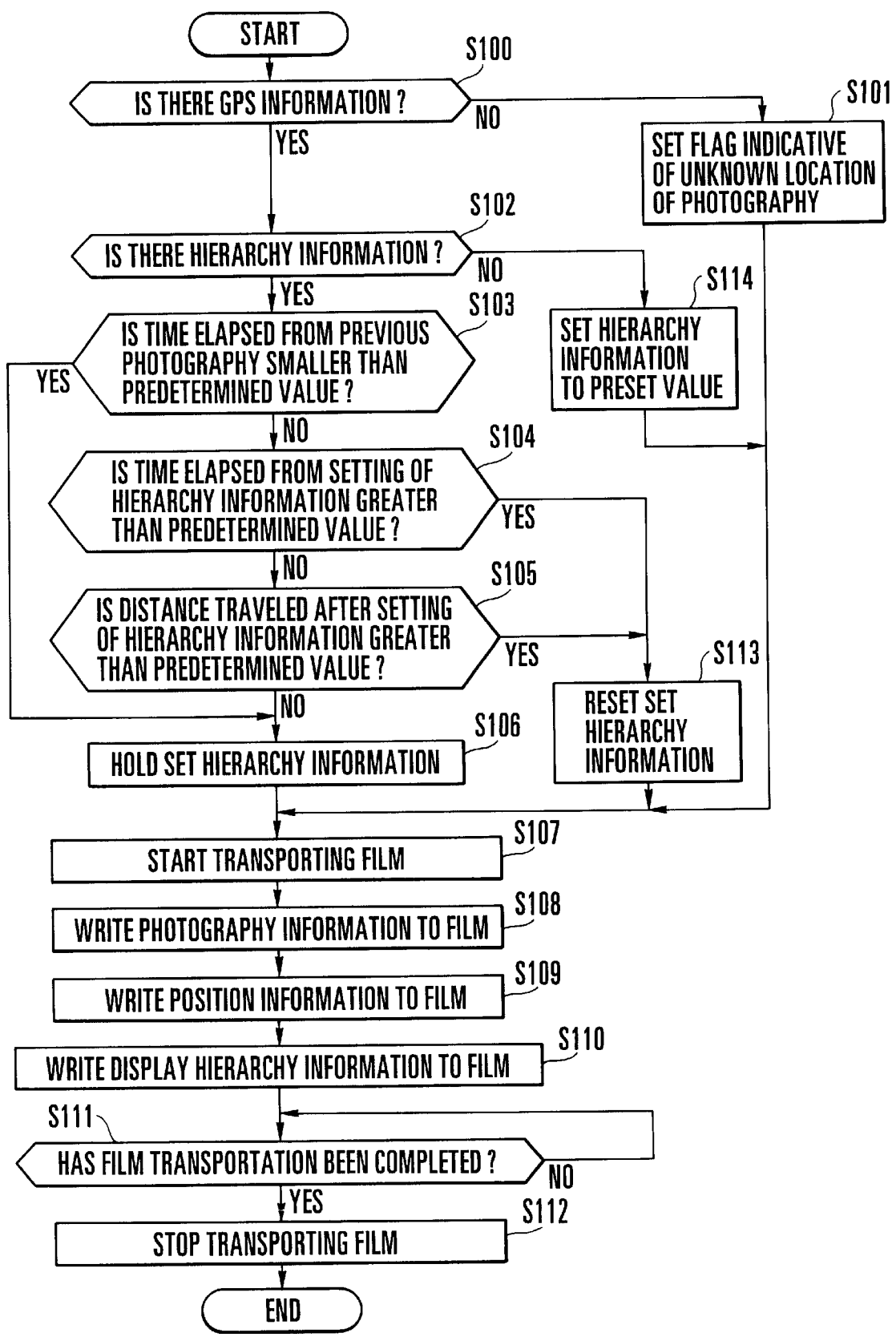
FIG. 3 is a flowchart showing the operation of writing information to a film in the camera according to the embodiment of the present invention.

A writing operation to be executed by the microprocessor 1 after the completion of an exposure operation will be described below with reference to the flowchart of FIG. 3.

First of all, in Step S100, it is determined whether GPS information is stored in the camera. If there is no GPS information, the process proceeds to Step S101, in which a flag indicating that the location of photography (image-taking) is unknown is set. Then, the process proceeds to Step S107 which will be described later.

If it is determined in Step S100 that there is GPS information, the process proceeds to Step S102, in which it is determined whether hierarchy information relative to the GPS information is set in the camera. If the hierarchy information is not set, the process proceeds to Step S114, in which hierarchy information relative to the GPS information stored in the camera is set to a default value so as to write hierarchy information based on a previously determined set value (hereinafter referred to also as the default value). Then, the process proceeds to Step S107 which will be described later.

On the other hand, if it is determined in Step S102 that the hierarchy information is set in the camera, the process proceeds to Step S103, in which it is determined what time has elapsed from the previous photography (image-taking). If the time elapsed from the previous photography is smaller (shorter) than a predetermined time, the process proceeds to Step S106, but if the time elapsed from the previous photography is greater (longer) than the predetermined time, the process proceeds to Step S104. In Step S104, it is determined whether the time elapsed after the hierarchy information has been set is longer than a predetermined time (which may be the same as or different from the above predetermined time), and if the time elapsed after the hierarchy information has been set is longer than the predetermined time, the process proceeds to Step S113, in which the hierarchy information which is currently set is reset and the previously set default value is set, and the process proceeds to Step S107. If it is determined in Step S104 that the time elapsed after the hierarchy information has been set is shorter than the predetermined time, the microprocessor 1 performs setting so that writing of hierarchy information data is performed on the basis of hierarchy information which is currently set in the camera, and the process proceeds to Step S105.

In Step S105, the microprocessor 1 determines the distance traveled by the camera after the hierarchy information has been set in the camera, and if the distance traveled is greater than a predetermine value, the process proceeds to Step S113, in which the currently set hierarchy information is reset as described above and the previously set default value is set. Then, the process proceeds to Step S107. If it is determined in Step S105 that the distance traveled by the camera after the hierarchy information has been set in the camera is smaller than the predetermine value, the microprocessor 1 performs setting so that writing of hierarchy information data is performed on the basis of the hierarchy information which is currently set in the camera. Then, the process proceeds to Step S106.

In Step S106, the microprocessor 1 holds the set hierarchy information. Then, in Step S107, the microprocessor 1 drives the motor driving circuit 15 and the like to start transporting the film F. In Step S108, the microprocessor 1 causes the magnetic head 10 to start writing to the film F photography information (image-taking information) such as the kind of light source, shutter time and aperture value. In Step S109, the microprocessor 1 causes the magnetic head 10 to write to the film F photography position information (image-taking position information) (absolute-position information such as latitude and longitude) and the like relative to an exposed frame. In Step 110, the microprocessor 1 causes the magnetic head 10 to write to the film F display hierarchy information indicating how minutely a position display should be provided on the basis of the photography position information written in Step S109.

In Step S111, the microprocessor 1 determines whether the transportation of the film F has been completed, and if the microprocessor 1 determines that it has not yet been completed, the microprocessor 1 causes the process to stay in Step S111. After that, if the microprocessor 1 determines that the transportation of the film F has been completed, the process proceeds to Step S112, in which the microprocessor 1 stops driving the motor driving circuit 15 and brings a series of operations to an end.

Figure 4:
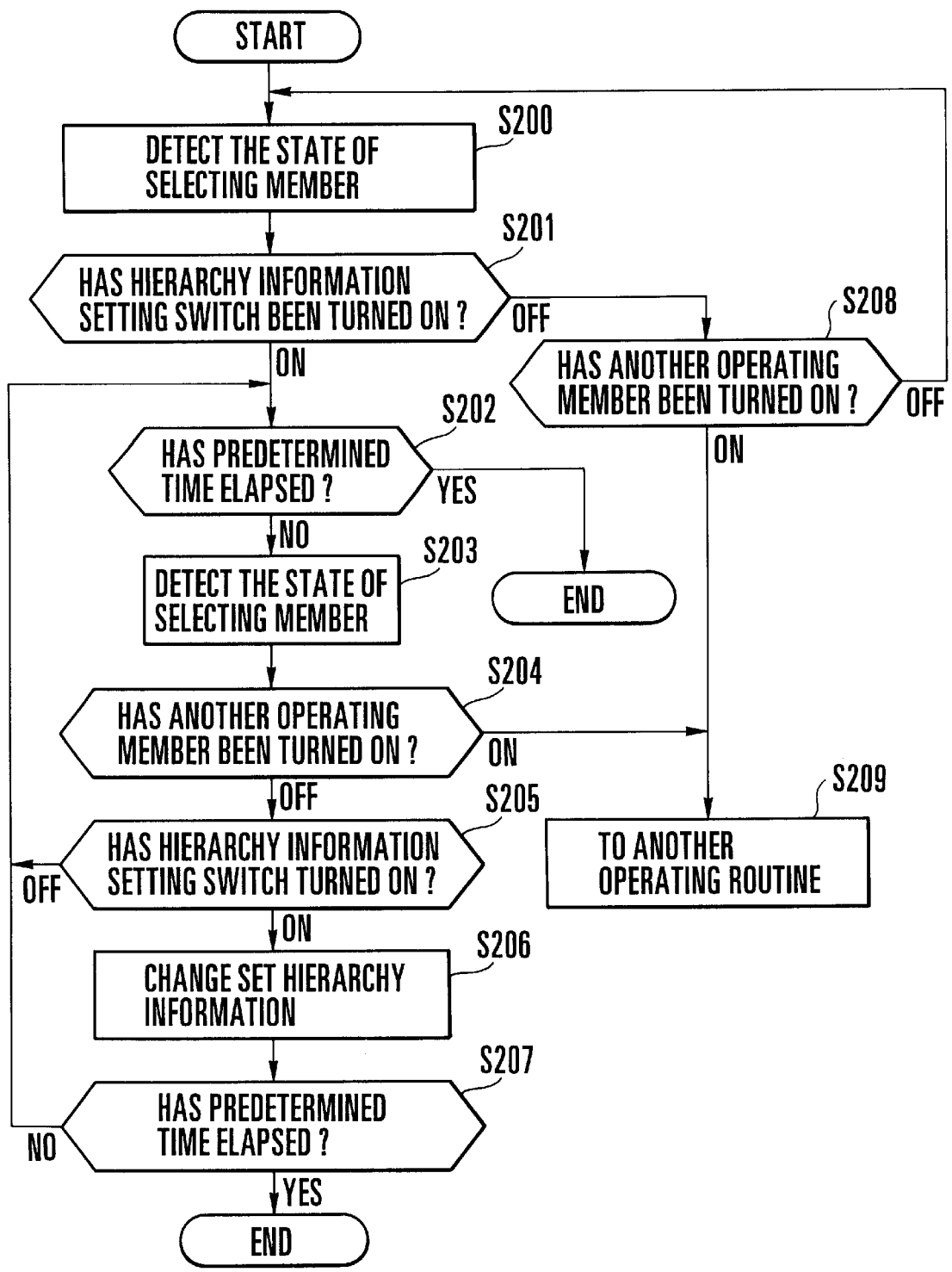
FIG. 4 is a flowchart showing the operation of setting data hierarchy information in the camera according to the embodiment of the present invention.

The operation of setting data hierarchy information will be described below with reference to the flowchart shown in FIG. 4.

First, in Step S200, the microprocessor 1 determines whether the display hierarchy selecting member 22 of the camera has been operated. If the display hierarchy selecting member 22 has not been operated, the process proceeds to Step S208, in which the microprocessor 1 determines whether an operating member other than the display hierarchy selecting member 22 has been operated. If an operating member other than the display hierarchy selecting member 22 has been operated, the process proceeds to Step S209, in which the microprocessor 1 performs control corresponding to the operation of the operating member. On the other hand, if an operating member other than the display hierarchy selecting member 22 has not been operated, the process returns to Step S200, in which the microprocessor 1 checks the state of operation of the display hierarchy selecting member 22.

If the microprocessor 1 determines in Step S201 that the display hierarchy selecting member 22 has been operated, the process proceeds to Step S202, in which the microprocessor 1 determines whether the time elapsed from the last operation of the display hierarchy selecting member 22 is longer than a predetermined time which is previously set, and if the elapsed time is longer than the predetermined time, the microprocessor 1 brings this routine to an end. If the elapsed time is shorter than the predetermined time, the process proceeds to Step S203, in which the microprocessor 1 detects a variation in the state of the display hierarchy selecting member 22. Then, the process proceeds to Step S204, in which the microprocessor 1 determines whether an operating member other than the display hierarchy selecting member 22 has been operated. If an operating member other than the display hierarchy selecting member 22 has been operated, the process proceeds to Step S209, in which the microprocessor 1 performs control corresponding to the operation of the operating member.

On the other hand, if it is not determined in Step S204 that an operating member other than the display hierarchy selecting member 22 has been operated, the process proceeds to Step S205, in which the microprocessor 1 determines whether the display hierarchy selecting member 22 has been operated. If the display hierarchy selecting member 22 has not been operated, the process returns to Step S202, in which an operation similar to the above-described one is repeated. On the other hand, if it is determined in Step S205 that the display hierarchy selecting member 22 has been operated, the process proceeds to Step S206, in which the microprocessor 1 changes set hierarchy information for indicating a hierarchal level at which to display position information. Then, in Step S207, the microprocessor 1 determines whether the time elapsed from the last operation of the display hierarchy selecting member 22 is longer than a predetermined time which is previously set, and if the elapsed time is longer than the predetermined time, the microprocessor 1 brings this routine to an end. If the elapsed time is shorter than the predetermined time, the process returns to Step S202, in which an operation similar to the above-described one is repeated.

FIGS. 5(A) to 5(F) are views showing display examples obtained when set hierarchy information is changed.

Referring to FIG. 5(A), an external display device 300 for displaying the state of the camera includes a hierarchy information display part 310, a shutter time display part 320, an aperture value display part 330 for displaying an aperture value in the external display device 300, and a frame counter display part 340.

If the display hierarchy selecting member 22 of the camera is operated and the set hierarchy information is changed, hierarchy information which is stored in the camera is updated, and the display in the hierarchy information display part 310 of the external display device 300 is changed as shown in FIGS. 5(A) to 5(F) so that a user is informed that the set hierarchy information has been updated.

Although the aforesaid embodiment has been described with reference to a camera which uses a magnetically writable type of film, the present invention can also be applied to other types of photographing apparatus (image-taking apparatus) having an optical, electrical or magnetic recording function.

As is apparent from the foregoing description, according to the above-described embodiment, it is possible to provide a camera capable of recording position information, which camera can release a user from the awkward operation of manually selecting the kind of information each time the user is to make use of position information after photography.

It is also possible to provide a camera capable of recording position information, in which a conversion table for converting position information to a place name is omitted and the memory capacity of the camera is reduced, and in which the time required to convert position information into display information can be reduced by displaying only a hierarchal name when a hierarchal level is selected.

It is also possible to provide a camera capable of recording position information, in which it is possible to improve the reliability of set display hierarchy information.

It is also possible to provide a camera capable of recording position information, in which it is possible to prevent a variation from occurring in display data relative to continuous exposed frames.

It is also possible to provide a camera capable of recording position information, in which it is possible to reduce the inaccuracy of display hierarchy information due to a movement of the location of photography.

It is also possible to provide a camera capable of recording position information, in which it is possible to reliably record the position information required to identify the location of photography (image-taking), even if the recording capacity for a recording part is insufficient.

It is to be noted that although the above description of the aforesaid embodiment has referred to a silver-halide camera which is one example of the optical apparatus, the range of application of the present invention covers digital cameras, video cameras and other combinations of such cameras.

Although a film is used as an image recording medium by way of example, the image recording medium may also be magnetic video tape, a solid-state memory, or a floppy disk.

What is claimed is:

1. An optical apparatus comprising:
   a detecting device which detects position information;
   a selecting device which selects hierarchal level information from among a plurality of hierarchal level information which indicates to what degree of detail the position information detected by the detecting device should be displayed,
   a recording device which records the detected position information and the selected hierarchal level information on an image recording medium, and
   a display device which displays the selected hierarchal level information.

2. An optical apparatus according to claim 1, wherein the position information is detected during image taking.

3. An optical apparatus according to claim 1, wherein the image recording medium is a film and the selected hierarchal level information is recorded for each frame of the film.

4. An optical apparatus according to claim 1, further comprising a hierarchal level resetting circuit, wherein if a time period which elapses after a previous selection of said selecting device is performed is longer than a predetermined time, hierarchal level information selected by the previous selection is reset by said heirarchal level resetting circuit.

5. An optical apparatus according to claim 4, said display device displaying a default hierarchal level if the hierarchal level information is reset.

6. An optical apparatus according to claim 1, further comprising a hierarchal level resetting circuit, wherein if a position indicated by a new position information detected by said detecting device is a predetermined distance away from a position indicated by previous position information, the selected hierarchal level information is reset by said hierarchal level resetting circuit.

7. An optical apparatus according to claim 1, wherein after the position information is recorded on the image recording medium, the selected individual hierarchal level information of said plural hierarchal level information is recorded on the image recording medium.

8. An optical apparatus according to claim 1, wherein the position information is absolute-position information indicative of latitude and longitude.

\* \* \* \* \*